A. BURGESS.
Magazine-Guns.
No. 8,288. Reissued June 18, 1878.
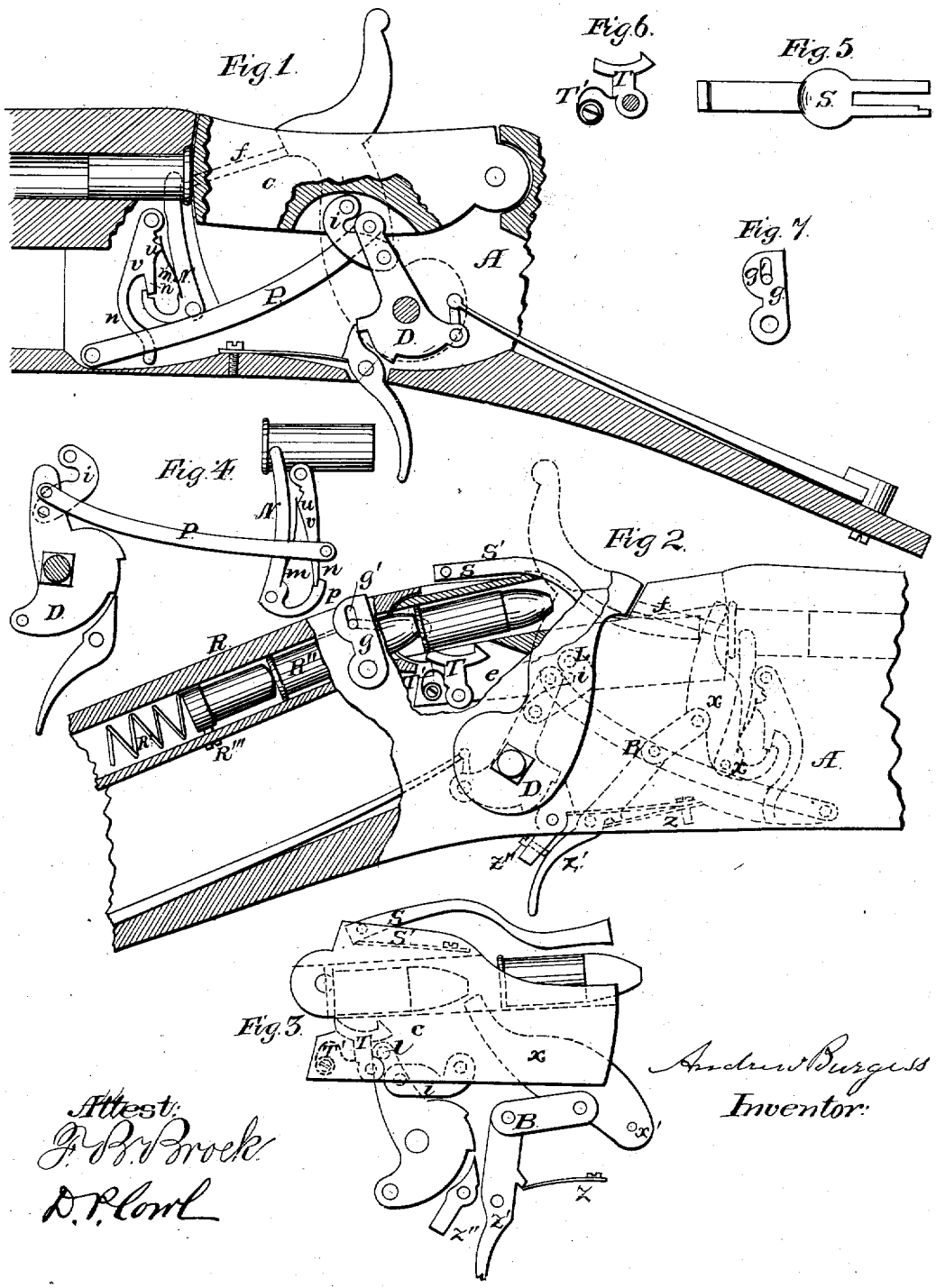
Attest:
F. P. Brock
D. P. Lord
Andrew Burgess
Inventor.
N. PETERS, PHOTO-LITHOGRAPHER, WASHINGTON, D. C.

UNITED STATES PATENT OFFICE.

ANDREW BURGESS, OF OWEGO, NEW YORK.

IMPROVEMENT IN MAGAZINE-GUNS.

Specification forming part of Letters Patent No. 128,208, dated June 25, 1872; Reissue No. 8,288, dated June 18, 1878; application filed June 5, 1878.

*To all whom it may concern:*

Be it known that I, ANDREW BURGESS, of Owego, Tioga county, and State of New York, have invented certain new and useful Improvements in Magazine Fire-Arms; and I do hereby declare that the following is a full, clear, and exact description thereof, which will enable others skilled in the art to make and use the same, reference being had to the accompanying drawing, forming part of this specification.

The object of this invention is to improve and simplify that class of breech-loading fire-arms which are used as self-loaders by having a magazine connected therewith, or as single-loaders when the operator may wish, or the magazine shall be empty; and it consists in the arrangement and combination of the parts hereinafter set forth and described.

In the accompanying drawing, Figure 1 represents a vertical longitudinal section of the arm as constructed without the magazine. Fig. 2 is the same with the addition of the magazine, and showing its arrangement. Fig. 3 is the breech-block and parts connected therewith. Fig. 4 shows the extractor and its connection with the tumbler. Fig. 5 is the breech-block cap or cover. Fig. 6 is the cartridge-feed regulator or detent. Fig. 7 is the magazine-stop.

Similar letters of reference indicate corresponding parts.

A is the bed-piece, which contains the breech-block C, and supports the operating mechanism of the gun.

The hammer is attached to the tumbler D, and operates the breech-block by the link *i* in the same manner as one of my guns patented September 19, 1871. N, Figs. 1 and 4, is the bar of the extractor, the upper part engaging the cartridge-flange, the lower part being pivoted to the bed-piece A, and bent upward to engage a point, *n*, of lever *v*, said lever being sprung back by the point of spring *m*, operating against it near the pivot above. The extractor is "set" by pushing forward the bar N in the act of inserting the cartridge.

When the hammer is carried a little beyond full-cock, the rod P, being pivoted to a projection of tumbler D, is carried back until a projection on the other end of said rod pulls back the lever *v*, releasing the bar N by disengaging the point *n* from notch *p*, when, if the force of spring *m* should not be sufficient to throw out the discharged shell, the lever *v* operates against the bar N at the point *u* by the further drawing back of the hammer, thus starting the shell, which is then thrown out by the recoil of the spring *m*. C is the breech-block, which is hollow at its rear end to allow the cartridges to enter from the magazine R, which extends backward through the breech of the gun. S is the breech-block cap, pivoted at its rear end to the breech-block, and held in position by small spring S′. T is the feed-regulator, pressed into engagement with the cartridge-flange by small spring T′. X is the pusher, pivoted at X′ to the bed-piece, and is provided with a spring, Z, to throw it back. It is connected with the trigger Z′, by which it is operated through the toggle-joint B.

It will be seen that the upper part of the tumbler D, to which the link *i* is pivoted, projects above said pivot, the extreme upper end having a screw or pin connecting the two sides, the upper part of link *i* being bent or cut out, so as to permit the joint to straighten when the hammer is down.

To operate this arm, we first turn back the cap S of the breech-block, leaving the mouth of the magazine open, into which we insert the cartridges. The flanges of the cartridges passing over the first point trip the feed-regulator T, thus allowing the cartridges to enter the magazine, when, by force of spring T′, the regulator returns to its former position, and, snapping in front of the flanges of the cartridges, prevents their escape. Then, closing the cap S, we may cock the piece and use it as a single-loader, only taking the precaution to carry the hammer but little back of the full-cock notch. To insure this the stop *g* is turned down toward the hammer, where it is retained by the friction-spring *g′*. The arm is then loaded by inserting the cartridge forward into the barrel, and fired by pulling the trigger, which, releasing the tumbler, allows the hammer to fall, the breech-block, which carries the firing-pin *f*, closing upward, by means of the link *i*, at the same time, and reaching position a little before or at the same time the hammer strikes.

To use the reserved charges in the magazine, we have only to turn back the stop *g*, which allows the hammer to be carried farther beyond the full-cock, when pin L trips the feed-regulator T, so that its rear point releases the flange of the cartridge, which, being sent forward by force of the spiral spring of the magazine, catches on the forward point of the feed-regulator T, where it is retained until the breech begins to close, when the feed-regulator, being released from contact with the lock of the arm, returns to first position by force of spring T′, thus leaving the cartridge free to spring forward into the barrel by impetus received from spiral spring R′.

The cartridge, in passing from the feed-regulator, forces up the cap S, which then assists to guide it into the chamber. The pusher X, working vertically through the breech-block, follows up the cartridge and drives it "home," said pusher being operated by the trigger and toggle B, so that when the trigger is straightening the joint B it throws the pusher forward, and, driving the cartridge home, the back part of trigger Z′ reaches set-screw in dog Z″. The one motion of pulling trigger pushes the cartridge into the barrel-chamber and discharges the gun by releasing the dog from the tumbler, allowing the hammer to fall and strike the firing-pin as the breech rises to position. When the hammer is again raised, after having fired the gun, the falling of the breech-block allows the pusher to be forced back by the spring Z.

The magazine-tube R has an opening or groove extending its whole length, and into which a point or screw of the follower R‴ slides freely, but, as it cannot pass the feed-regulator T, is prevented from running out after the cartridges have all been delivered.

Having thus described my invention, I claim as new and desire to secure by Letters Patent—

1. The spring-bar N, in combination with the lever *v*, when the latter is pivoted to the bed-piece, and provided with an arm, *n*, engaging with a notch, *p*, in a prolongation of the bar N, in the manner and for the purpose set forth.

2. In a magazine fire-arm, a feed-regulator or detent arranged to engage the flanges of the cartridges and hold them until released by the operation of the arm, in combination with the movable parts of the breech mechanism, the whole so arranged that the detent is operated to release the cartridges, one at a time, in the act of opening and closing the breech, all substantially as described.

3. In a magazine fire-arm, the combination of the following elements, viz: a magazine located in the rear stock or butt, a spring in said magazine to feed the cartridges forward, and a stop or detent operated automatically by the movable parts of the breech mechanism to engage the flanges and to regulate the feeding of the cartridges.

4. In combination with a magazine adapted to be charged from its delivery orifice, a pivoted stop or detent to engage in front of the flanges of the cartridges and hold them as they are fed in, as described.

5. The pushing or loading device, consisting of the trigger Z′ and toggle B, when combined for operation with the pusher X, as and for the purpose set forth.

ANDREW BURGESS.

Witnesses:
GEO. M. LOCKWOOD,
ANNIE B. IRISH.